(12) United States Patent
Pulford

(10) Patent No.: US 6,952,679 B1
(45) Date of Patent: Oct. 4, 2005

(54) METHOD AND SYSTEM FOR EVALUATING QUALITY SERVICES

(75) Inventor: Sondra Pulford, Houston, TX (US)

(73) Assignee: Texas Shopper Network, Inc., Houston, TX (US)

(*) Notice: Subject to any disclaimer, the term of this patent is extended or adjusted under 35 U.S.C. 154(b) by 0 days.

(21) Appl. No.: 09/361,353

(22) Filed: Jul. 26, 1999

(51) Int. Cl.[7] .............................................. G06F 17/60
(52) U.S. Cl. ............................................ 705/7; 705/11
(58) Field of Search ................................ 705/11, 10, 7

(56) References Cited

U.S. PATENT DOCUMENTS

| | | | | |
|---|---|---|---|---|
| 4,345,315 A | * | 8/1982 | Cadotte et al. ................ | 705/10 |
| 5,041,972 A | * | 8/1991 | Frost ............................. | 705/10 |
| 5,331,544 A | | 7/1994 | Lu et al. ....................... | 364/401 |
| 5,521,814 A | | 5/1996 | Teran et al. .................. | 364/402 |
| 5,630,069 A | | 5/1997 | Flores et al. ................. | 395/207 |
| 5,675,662 A | | 10/1997 | Deaton et al. .............. | 382/137 |
| 5,822,744 A | * | 10/1998 | Kesel ........................... | 706/52 |
| 6,026,387 A | * | 2/2000 | Kesel ........................... | 706/52 |

FOREIGN PATENT DOCUMENTS

| | | | | |
|---|---|---|---|---|
| WO | WO 99/34274 A | * | 8/1999 | ........... G06F/16/20 |

OTHER PUBLICATIONS

Hamburg, Ruth. "Undercover retailing: how a mystery shopper program can clue you in." Do–It–Yourself Retailing, v162 n4, Apr. 1992, p52(8).*

Liparulo, Robert. "Undercover agents: 'private eyes' clue you in to your store's performance." Party & Paper Retailer, v8, n5, May 1993, p48(2).*

Brokaw, Leslie. "The Mystery-Shopper Questionnaire." Inc., v13 n6, Jun. 1991, pp 94–97.*

Weiser, Jay R. "Building a sales and service culture." Texas Banking, v86 n11, Nov. 1997, pp 18–19.*

Morrall, Katherine. "Up front about the fine print." Bank Marketing, v27 n1, Jan. 1995, pp 16–22.*

Dorman, Karen. "Mystery shopping results can shape your future," Bank Marketing, Aug. 1994.*

Berry, Leonard. "Listening to the customer—the concept of a service–quality information system," Sloan Management Review, Spring 1997.*

Boyd, Fraser J. "The customer may be always right—but who is the customer?" ARMA Records Management Quarterly v31, Apr. 1997.*

Hudkins, Lonnie. "Program Keeps Books for Home Businesses," Buffalo News, Jun. 13, 1993.*

(Continued)

Primary Examiner—Tariq R. Hafiz
Assistant Examiner—Catherine M. Colón
(74) Attorney, Agent, or Firm—D'Ambrosio and Associates, PLLC

(57) ABSTRACT

A method and system for evaluating quality service though the use of anonymous shoppers. The method and system provide executives and managers of retail operations with an essentially objective evaluation of the performance of its business operations through the use of data obtained by anonymous shoppers. The method formulates essentially objective evaluation parameters for a business operation and composes essentially objective questions based on parameters. Anonymous shoppers are trained to monitor quality service and provide essentially objective responses. Key areas of quality service are evaluated by responses to questions. Numerical ratings are assigned to the responses using a weighted point system; these ratings are combined for each key area of business operation. The resulting numerical ratings are further combined for a single overall rating. The numerical ratings are entered into a computer to generate one or more managerial reports.

12 Claims, 15 Drawing Sheets

OTHER PUBLICATIONS

Morrison, Lisa J. et al. "Mystery customer research: cognitive processes affecting accuracy," Journal of the Market Research Society, Apr. 1997.*

Guzman, Ilona. "Using Shopper Studies to Evaluate Service Quality," Marketing News, v26n19, Sep. 14, 1992.*

"Who Was That Masked Customer? Shop'n Chek Helps Retailers Track In–Store personnel Performance," Chain Store Age Executive, v64n11, Nov. 1988.*

Lubin, Paul C. "Mystery shopping: The age–old research technique can be used for new age compliance monitoring," Retail Banking Digest, v14, Sep./Oct. 1994.*

Hyder, Zakia. "Mystery shopping," Small Business News, v6, Nov. 1, 1998.*

Gurney, Peter. "Mystery Shopping Boosts Service Satisfaction in Call Centers" [online], Customer Interface, Oct. 1998 [retrieved on Jul. 30, 2001]. Retrieved from the Internet: <URL: http://www.c–interface.com/issues/1098fe/1098pg72.htm>.*

Wilson et al. "Public transport: the role of mystery shopping in investment decisions," Journal of the Market Research Society, 40, 4, 285(9). Oct. 1998.*

Forms/Surveys data sheet [online], SecretShopper.com, 1990 [retrieved on Aug. 28, 2001]. Retrieved from the Internet: <URL: http://www.secretshopper.com/sos/sales/clientforms.html>.*

Harper, Gary. "An established shopper program can be the answer for customer service management" [online], Quirks, Jan. 1998 [retrieved on Jul. 30, 2001]. Retrieved from the Internet: <URL:http://www.quirks.com/articles/article_print.asp?arg_articleid=305>.*

Leeds, Barry. "Mystery Shopping: From Novelty to Necessity," Bank Marketing, vol. 27, Issue 6, p17, 5p, 3charts, 9c. Jun. 1995.*

Prince, Dan. "How to ensure an objective mystery shop" [online], Quirks, Jan. 1996 [retrieved on Jul. 30, 2001]. Retrieved from the Internet: <URL: http://www.quirks.com/articles/article_print.asp?arg_articleid=25>.*

Best Practice in Mystery Customer Research [online], The Market Research Society, Mar. 1997 [retrieved on Jul. 30, 2001]. Retrieved from the Internet: <URL: http://www.marketresearch.org.uk/code.htm#mystery>.*

* cited by examiner

Fig. 1

A method for evaluating retail store operations comprising:

| Formulating essentially objective evaluation parameters for a retail store composing essentially objective questions based on parameters   110 |

| Training anonymous shoppers to monitor retail store operations and provide essentially objective responses to questions.   120 |

| Evaluating key areas of retail store operations by responses to questions composed according to the formulated parameters using anonymous shoppers trained to respond to questions.   130 |

| Assigning a numerical rating to each response using a weighted point system.   140 |

| Combining the ratings of the key areas of retail store operation and further combining resulting numerical ratings for a single overall rating for the retail store.   150 |

| Entering the numerical ratings into a computer.   160 |

| Using a software program to generate a managerial report from the numerical data.   170 |

Fig. 2

A method for evaluating retail store operations comprising:

| Formulating essentially objective evaluation parameters for a retail store and composing essentially objective questions based on parameters; 210 |

| Training anonymous shoppers to monitor retail store operations and provide essentially objective responses to questions prepared based on the formulated parameters; 220 |

| Evaluating key areas of retail store operations by responses to questions composed according to the formulated parameters formulated using anonymous shoppers trained to respond to questions; 230 |

| Assigning a numerical rating to each response using a weighted point system. 240 |

| Combining the ratings of the key areas of retail store operation and further combining resulting numerical ratings for a single overall rating for the retail store. 250 |

| Entering the numerical ratings into a computer; 260 |

| Repeating steps the steps listed in 230-260 after one or more specific time intervals to generate at least two sets of data; 270 |

| Executing a computer program to compare the sets of data and generate a managerial report comparing retail store operations of one store over at least two different time intervals. 280 |

Fig. 3

A method for evaluating retail store operations comprising:

| Formulating essentially objective evaluation parameters for a specific retail store and composing essentially objective questions based on parameters;   310 |

| Training anonymous shoppers to monitor retail store operations and provide essentially objective responses to questions;   320 |

| Evaluating key areas of retail store operations by responses to questions composed according to formulated parameters using anonymous shoppers trained to respond to questions;   330 |

| Assigning a numerical rating to each response using a weighted point system.   340 |

| Combining the ratings of the key areas of retail store operation and further combining resulting numerical ratings for a single overall rating for the retail store.   350 |

| Entering the numerical ratings into a computer;   360 |

| Repeating the above-listed steps for two or more retail stores within a chain of retail stores;   370 |

| Executing a computer program to generate a managerial report comparing the performance of the evaluated retail stores within the chain.   380 |

Fig. 4

A system for evaluating retail store operations comprising:

| A plurality of essentially objective questions based on essentially objective evaluation parameters formulated for the retail store; 410 |

⇓

| A manual for training anonymous shoppers to monitor retail store operations and provide essentially objective responses to the questions; 420 |

⇓

| Means for use by anonymous shoppers to evaluate key areas of retail store operations by assigning numerical ratings to the essentially objective responses; 430 |

⇓

| Means for combining the numerical ratings to obtain a single rating for the retail store; 440 |

⇓

| A computer for compiling the ratings and executing a computer program to generate a managerial report based on the ratings. 450 |

Figure 5A

TEXAS SHOPPERS NETWORK
GROCERY STORE EVALUATION FORM

Date: _____ Day: _____   Store Number: _____ 510
Time In: _____ Out: _____   Store Address: _____

Evaluator Number: _____

| EXTERIOR 520 |
|---|

How many carts were outside the designated area? _____
Were the trashcans neat & not overloaded?  ☐Y ☐N
Was front entrance way free & clear
   of any clutter (signs, etc.)?  ☐Y ☐N
Was the parking lot & front of the store appealing?  ☐Y ☐N

_____
_____

| INSIDE THE STORE 530 |
|---|

Were the shopping carts available and organized?  ☐Y ☐N
Floors clean and free of debris?  ☐Y ☐N
How many associates were NOT
   wearing nametags? _____
How many store associates passed
   in front of you? _____
How many of these associates greeted
   you with a smile or eye contact? _____
Ask a store associate for directions to an item:
   Did s/he take you to the item?  ☐Y ☐N
   Was the associate polite?  ☐Y ☐N
   Was the associate neat and well-groomed?  ☐Y ☐N
   Associate's Name: _____
Were merchandise/food items clearly priced?  ☐Y ☐N
If no, which aisle, department or item was not
clearly priced.

_____
_____
_____
_____
_____

| PRODUCE 540 |
|---|

Were fruit & vegetables fresh/appealing?  ☐Y ☐N
Was everything clearly priced/marked?  ☐Y ☐N
Was everything neatly arranged?  ☐Y ☐N
Was floor area and mats neat & clean?  ☐Y ☐N

_____
_____
_____

| BAKERY 550 |
|---|

Was everything neat and organized?  ☐Y ☐N
Was everything clearly priced/marked?  ☐Y ☐N
Were sample trays available/filled?  ☐Y ☐N
Ask to sample a cookie, or make a purchase.
   Was associate handling food properly?  ☐Y ☐N
   Were associates wearing a hat/hair pulled back?  ☐Y ☐N

_____
_____

| SEAFOOD/MEAT DEPARTMENT 560 |
|---|

Did seafood/meat cases look neat & organized?  ☐Y ☐N
Were associates handling food wearing gloves?  ☐Y ☐N
Were associates wearing a hat/hair pulled back?  ☐Y ☐N
Was associate friendly and helpful?  ☐Y ☐N

_____
_____
_____

©1998 by Texas Shoppers Network™ Inc All Rights Reserved

| HOT DELI/APPETEASER 570 |
|---|

Was the salad bar fresh looking and appetizing?  ☐Y ☐N
Were hot deli selections appetizing?  ☐Y ☐N
Were sample trays available/filled?  ☐Y ☐N
Were associates handling food wearing gloves?  ☐Y ☐N
Were associates wearing a hat/hair pulled back?  ☐Y ☐N
Ask associate "What are the Specials today?"
Did the associate use suggestive selling?  ☐Y ☐N
Was the dining area (tables and floor) clean?  ☐Y ☐N

_____
_____
_____
_____
_____

| REST ROOMS 580 |
|---|

Which rest room did you visit?  ☐ Men's  ☐ Women's
Was the rest room properly stocked with:
   Tissue  ☐Y ☐N
   Soap  ☐Y ☐N
   Paper towels  ☐Y ☐N
Was the rest room clean?  ☐Y ☐N

_____
_____

| CHECK OUT 590 |
|---|

Did the cashier greet you?  ☐Y ☐N
Did the cashier immediately ask:
   1. For your "R" Card?
   2. Are you a member of our Airline Program?  ☐Y ☐N
Was s/he courteous and friendly?  ☐Y ☐N
   Name of cashier: _____
Was your purchase rung up correctly?  ☐Y ☐N
Was the speed of your transaction acceptable?  ☐Y ☐N
If paid with cash, did the cashier count your
   change back to you?  ☐ N/A  ☐Y ☐N
If paid by check or credit card, did the cashier
   use your name at any time?  ☐ N/A  ☐Y ☐N
Were your groceries bagged correctly?  ☐Y ☐N
Did s/he ask, "Is plastic ok?"  ☐Y ☐N
What was the bagger's name? _____
   Did s/he offer to carry out your groceries
   or say "Thank you?"  ☐Y ☐N

_____
_____

Amount of Purchase: $ _____
(Receipt must be attached)

| SCORING | FOR TSN USE ONLY: 600 |
|---|---|
| In-Store Shop | |
|   Exterior | _____ |
|   Inside the Store | _____ |
|   Produce | _____ |
|   Bakery | _____ |
|   Meat | _____ |
|   Deli | _____ |
|   Rest Rooms | _____ |
|   Check Out | _____ |
| TOTAL: | _____ |

Figure 5B

TEXAS SHOPPERS NETWORK
GROCERY STORE EVALUATION FORM

Date: _____  Day: _____  Store Number: _____
Time In: _____  Out: _____  Store Address: _____

Evaluator Number: _____

EXTERIOR 525
How many carts were outside the designated area? _____
Were the trashcans neat & not overloaded?  ☐ Y  ☐ N
Was front entrance way free & clear
  of any clutter (signs, etc.)?  ☐ Y  ☐ N
Was the parking lot & front of the store appealing?  ☐ Y  ☐ N

INSIDE THE STORE 535
Were the shopping carts available and organized?  ☐ Y  ☐ N
Floors clean and free of debris?  ☐ Y  ☐ N
How many associates were NOT
  wearing nametags? _____
How many store associates passed
  in front of you? _____
How many of these associates greeted
  you with a smile or eye contact? _____
Ask a store associate for directions to an item:
  Did s/he take you to the item?  ☐ Y  ☐ N
  Was the associate polite?  ☐ Y  ☐ N
  Was the associate neat and well-groomed?  ☐ Y  ☐ N
  Associate's Name: _____
Were merchandise/food items clearly priced?  ☐ Y  ☐ N
If no, which aisle, department or item was not
clearly priced.
_____
_____
_____
_____
_____
_____

PRODUCE 545
Were fruit & vegetables fresh/appealing?  ☐ Y  ☐ N
Was everything clearly priced/marked?  ☐ Y  ☐ N
Was everything neatly arranged?  ☐ Y  ☐ N
Was floor area and mats neat & clean?  ☐ Y  ☐ N
_____
_____
_____

BAKERY 555
Was everything neat and organized?  ☐ Y  ☐ N
Was everything clearly priced/marked?  ☐ Y  ☐ N
Were sample trays available/filled?  ☐ Y  ☐ N
Ask to sample a cookie, or make a purchase.
  Was associate handling food properly?  ☐ Y  ☐ N
  Were associates wearing a hat/hair pulled back?  ☐ Y  ☐ N
_____
_____

SEAFOOD/MEAT DEPARTMENT 565
Did seafood/meat cases look neat & organized?  ☐ Y  ☐ N
Were associates handling food wearing gloves?  ☐ Y  ☐ N
Were associates wearing a hat/hair pulled back?  ☐ Y  ☐ N
Was associate friendly and helpful?  ☐ Y  ☐ N
_____
_____
_____

©1998 by Texas Shoppers Network™ Inc All Rights Reserved

HOT DELI/APPETEASER 575
Was the salad bar fresh looking and appetizing?  ☐ Y  ☐ N
Were hot deli selections appetizing?  ☐ Y  ☐ N
Were sample trays available/filled?  ☐ Y  ☐ N
Were associates handling food wearing gloves?  ☐ Y  ☐ N
Were associates wearing a hat/hair pulled back?  ☐ Y  ☐ N
Ask associate "What are the Specials today?"
Did the associate use suggestive selling?  ☐ Y  ☐ N
Was the dining area (tables and floor) clean?  ☐ Y  ☐ N
_____
_____
_____
_____

REST ROOMS 585
Which rest room did you visit?  ☐ Men's  ☐ Women's
Was the rest room properly stocked with:
  Tissue  ☐ Y  ☐ N
  Soap  ☐ Y  ☐ N
  Paper towels  ☐ Y  ☐ N
Was the rest room clean?  ☐ Y  ☐ N
_____
_____

CHECK OUT 595
Did the cashier greet you?  ☐ Y  ☐ N
Did the cashier immediately ask:
  1. For your "R" Card?
  2. Are you a member of our Airline Program?  ☐ Y  ☐ N
Was s/he courteous and friendly?  ☐ Y  ☐ N
  Name of cashier: _____
Was your purchase rung up correctly?  ☐ Y  ☐ N
Was the speed of your transaction acceptable?  ☐ Y  ☐ N
If paid with cash, did the cashier count your
  change back to you?  ☐ N/A  ☐ Y  ☐ N
If paid by check or credit card, did the cashier
  use your name at any time?  ☐ N/A  ☐ Y  ☐ N
Were your groceries bagged correctly?  ☐ Y  ☐ N
Did s/he ask, "Is plastic ok?"  ☐ Y  ☐ N
What was the bagger's name? _____
  Did s/he offer to carry out your groceries
  or say "Thank you?"  ☐ Y  ☐ N
_____
_____

Amount of Purchase: $ _____
(Receipt must be attached)

SCORING         FOR TSN USE ONLY:    615
In-Store Shop
  Exterior        _____
  Inside the Store _____
  Produce         _____
  Bakery          _____
  Meat            _____
  Deli            _____
  Rest Rooms      _____
  Check Out       _____
  TOTAL:          _____

Figure 10    TEXAS SHOPPERS™ INC
           HAIR SALON AND SPA EVALUATION FORM Date: _____    Day: _____         Store Address: _____
Time In: _____    Out: _____         Evaluator Number: _____

| EXTERIOR | |
|---|---|
| Were Front of Spa Appealing? | ☐Y ☐N |
| Was front entrance way free and clear of any clutter (signs etc)? | ☐Y ☐N |
| Was the parking lot free of litter? | ☐Y ☐N |
| Were shopping carts available and organized? | ☐Y ☐N |

| | |
|---|---|
| Was your stylist ready and on time? | ☐Y ☐N |
| Was hair salon neat and clean? | ☐Y ☐N |
| Was your stylist friendly and helpful? | ☐Y ☐N |
| Were you satisfied with your stylist? | ☐Y ☐N |
| Did stylist explain any of our special programs? | ☐Y ☐N |

| SALESROOM INSIDE THE SPA | |
|---|---|
| Was floor clean and free of debris? | ☐Y ☐N |
| How many associates were NOT wearing Nametags? | |
| Were you greeted with a smile or eye contact? | ☐Y ☐N |
| Were display cases attractive & well stocked? | ☐Y ☐N |
| Was sales literature current and displayed? | ☐Y ☐N |
| Were associates neat and well groomed? | ☐Y ☐N |
| Were sales items clearly priced? | ☐Y ☐N |
| Were inside and outside windows clean? | ☐Y ☐N |
| Was current ad posted and available? | ☐Y ☐N |
| Did cashier ask: "Did you enjoy your visit with us today? | ☐Y ☐N |
| Did cashier thank you and ask you to come back? | ☐Y ☐N |

| SPA | |
|---|---|
| Was spa area clean and inviting? | ☐Y ☐N |
| Was whirl pool clean and not more than 103° f? | ☐Y ☐N |
| Was sauna clean and not more than 110°f? | ☐Y ☐N |
| Were all towels & slippers clean & neatly stacked? | ☐Y ☐N |
| Was masseuse friendly and effective? | ☐Y ☐N |
| Did masseuse explain our four message package? | ☐Y ☐N |
| Upon concluding did you feel clean & refershed? | ☐Y ☐N |

| REST ROOMS | |
|---|---|
| Which rest room did you visit? | Men's ☐  Women's ☐ |
| Was the rest room properly stocked with: | |
| Tissue | ☐Y ☐N |
| Soap | ☐Y ☐N |
| Paper Towels | ☐Y ☐N |
| Was the rest room clean? | ☐Y ☐N |

| CUSTOMER WAITING ROOM | |
|---|---|
| Was fresh coffee available? | ☐Y ☐N |
| Was area neat and well managed? | ☐Y ☐N |
| Was room well lit? | ☐Y ☐N |
| Was juice bar clean & well stocked? | ☐Y ☐N |
| Were there plenty of magazines? | ☐Y ☐N |
| Was food tasty and fresh? | ☐Y ☐N |
| Were advertised items available? | ☐Y ☐N |
| Was TV and Telephone available? | ☐Y ☐N |

| SCORING IN-STORE SHOP | FOR TSN USE ONLY: |
|---|---|
| Exterior | _____ |
| Inside the Store | _____ |
| Automotive/Hardware | _____ |
| Clothing Departments | _____ |
| Rest Rooms | _____ |
| Check Out | _____ |
| TOTAL: | _____ |

1998 by Texas Shoppers Network ™ Inc All Rights Reserved

Figure 11       TEXAS SHOPPERS NETWORK™ INC
              AUTOMOTIVE REPAIR STORE EVALUATION FORM Date: _____  Day: _____  Store Address: _____
Time In: _____  Out: _____

Evaluator Number: _____

| EXTERIOR | | |
|---|---|---|
| Was front entrance way free & clear of any clutter (signs, etc.)? | ☐ Y | ☐ N |
| Was the parking lot & front of the store appealing? | ☐ Y | ☐ N |
| Were outside signage well lit? | ☐ Y | ☐ N |
| Were tire racks filled and marked? | ☐ Y | ☐ N |

| SALESROOM INSIDE THE STORE | | |
|---|---|---|
| Was floor clean and free of debris? | ☐ Y | ☐ N |
| How many associates were NOT wearing nametags? | | |
| Were sales displays neat & well stocked? | ☐ Y | ☐ N |
| Was sales literature current & displayed? | ☐ Y | ☐ N |
| Were associates neat and well-groomed? | ☐ Y | ☐ N |
| Were sale items clearly priced? | ☐ Y | ☐ N |
| Were inside and outside windows clean ? | ☐ Y | ☐ N |
| | ☐ Y | ☐ N |
| Was current ad posted ? | ☐ Y | ☐ N |
| Were trash cans neat & not overloaded? | ☐ Y | ☐ N |

| CUSTOMER WAITING ROOM | | |
|---|---|---|
| Was fresh coffee available? | ☐ Y | ☐ N |
| Was area neat and well arranged? | ☐ Y | ☐ N |
| Was room well lit? | ☐ Y | ☐ N |
| Were there plenty of magazines? | ☐ Y | ☐ N |
| Was TV & Telephone available? | ☐ Y | ☐ N |

| SERVICE AREA | | |
|---|---|---|
| Was service area neat and clean? | ☐ Y | ☐ N |
| Were you allowed to watch the repairs? | ☐ Y | ☐ N |
| Were you told about the oil & lube special? | ☐ Y | ☐ N |
| Were you offered our free 15 point inspection? | ☐ Y | ☐ N |
| Did associate explain the details of the inspection? (i.e., free tire rotation, topping off fluid levels etc) | ☐ Y | ☐ N |
| Were you told of any problems with your vehicle? | ☐ Y | ☐ N |
| If you answered yes, Was the explanation clear? | ☐ Y | ☐ N |
| Were you provided with a written estimate of all the recommended work ? | ☐ Y | ☐ N |
| Were you offered our special warranty? | ☐ Y | ☐ N |
| | ☐ Y | ☐ N |

| REST ROOMS | | |
|---|---|---|
| Which rest room did you visit? ☐ Men's ☐ Women's | | |
| Was the rest room properly stocked with: | | |
| Tissue | ☐ Y | ☐ N |
| Soap | ☐ Y | ☐ N |
| Paper towels | ☐ Y | ☐ N |
| Was the rest room clean? | ☐ Y | ☐ N |

SCORING:             FOR INTERNAL USE ONLY
In-Store Shop
  Exterior          _____
  Sales Room        _____
  Waiting Room      _____
  Service Area      _____
  Rest Room         _____
  Check Out         _____
  TOTAL:            _____

© 1998 by Texas Shoppers Network™ Inc All Rights Reserved

Figure 12    TEXAS SHOPPERS NETWORK™ INC
             DEPARTMENT STORE EVALUATION FORM

Date: _____    Day: _____    Store Number: _____
Time In: _____   Out: _____    Store Address: _____

Evaluator Number: _____

| EXTERIOR | |
|---|---|
| Were the trash cans neat & not overloaded? | ☐Y ☐N |
| Was front entrance way free of litter? | ☐Y ☐N |
| Was the parking lot & front of the store appealing? | ☐Y ☐N |
| Were shopping carts available and organized? | ☐Y ☐N |

_____
_____
_____

| INSIDE THE STORE | |
|---|---|
| Was service desk associate handling customers in a timely & friendly manner? Name: _____ | ☐Y ☐N |
| Floors clean and free of debris? | ☐Y ☐N |
| How many associates passed within 10 feet of you? | |
| How many of these associates greeted you with a smile or eye contact? | |
| Ask a store associate for directions to an item: | |
|    Did s/he take you to the item? | ☐Y ☐N |
|    Was the associate polite? | ☐Y ☐N |
|    Associate's name: | |
| Were merchandise items clearly priced/labeled? | ☐Y ☐N |
| Were aisles uncluttered/easy to get to? | ☐Y ☐N |
| Names of associates you visited with & department: | |
| Were these associates friendly and helpful? | ☐Y ☐N |
| Name: _____ Dept: _____ | |

_____
_____
_____

Name: _____ Dept: _____

_____
_____
_____

Comments: _____
_____
_____
_____
_____
_____
_____
_____

| AUTOMOTIVE – HARDWARE | |
|---|---|
| Were automotive shelves well stocked? | ☐Y ☐N |
| Were automotive items neat & organized? | ☐Y ☐N |
| Were hardware shelves well stocked? | ☐Y ☐N |
| Were hardware items neat & organized? | ☐Y ☐N |
| Were automotive sale items available? | ☐Y ☐N |
| Were hardware sale items available? | ☐Y ☐N |
| Were advertised items available? | ☐Y ☐N |
| Were all items clearly & correctly priced? | ☐Y ☐N |

_____
_____
_____
_____

© 1998 by Texas Shoppers Network ™ Inc All Rights Reserved

| CLOTHING DEPARTMENTS | |
|---|---|
| Were items in Children's Dept Neatly Displayed? | ☐Y ☐N |
| Were items in Women's Dept Neatly Displayed? | ☐Y ☐N |
| Were items in Men's Dept Neatly Displayed? | ☐Y ☐N |
| Was fitting room area clean & free of merchandise? | ☐Y ☐N |
| Were ad items available in all departments? | ☐Y ☐N |
| Were all departments well stocked? | ☐Y ☐N |
| Ask an associate in one of these departments for an item | |
|    Was associate friendly and helpful? | ☐Y ☐N |
|    Did the associate take you to the item? | ☐Y ☐N |
| Name (s): | |

_____
_____
_____
_____
_____

| REST ROOMS | |
|---|---|
| Which rest room did you visit? Men's ☐ Women's ☐ | |
| Was the rest room properly stocked with: | |
|    Tissue | ☐Y ☐N |
|    Soap | ☐Y ☐N |
|    Seat protectors | ☐Y ☐N |
|    Paper Towels | ☐Y ☐N |
| Was the rest room clean? | ☐Y ☐N |

_____
_____
_____

| CHECK OUT | |
|---|---|
| Did the cashier greet you? | ☐Y ☐N |
| Was the cashier courteous and friendly? | ☐Y ☐N |
|    Name of cashier: | |
| Was your purchase rung up correctly? | ☐Y ☐N |
| Was the speed of your transaction acceptable? | ☐Y ☐N |
| If paid with cash, did the cashier count your change back to you?    ☐N/A | ☐Y ☐N |
| If paid by check or credit card, did the cashier use your name at any time?    ☐N/A | ☐Y ☐N |
| Were your groceries bagged correctly? | ☐Y ☐N |
| Did cashier say "Thank you for Shopping at "Name of Store"? | ☐Y ☐N |

_____
_____
_____

Amount of Purchase: $_____
(Receipt must be attached)

| SCORING | FOR TSN USE ONLY: |
|---|---|
| IN-STORE SHOP | |
| Exterior | _____ |
| Inside the Store | _____ |
| Automotive/Hardware | _____ |
| Clothing Departments | _____ |
| Rest Rooms | _____ |
| Check Out | _____ |
| TOTAL: | _____ |

METHOD AND SYSTEM FOR EVALUATING QUALITY SERVICES

FIELD OF THE INVENTION

The present invention relates to a method and system for evaluating quality service. More specifically, the present invention relates to an essentially objective method and system for evaluating the performance of business operations through the use of data obtained by anonymous shoppers.

BACKGROUND OF THE INVENTION

Performance evaluations for business operations are an important aspect of quality service for any business that provides a consumer type service. These evaluations can be performed in-store for retail operations as well as on-site for other types of service businesses, hospitals, banking, personnel services automotive repair, restaurants etc. Alternatively, the evaluations can be based on telephone interviews. Whether on-site or by telephone, the evaluations performed according to the method and system of this invention provide an essentially objective picture of how a business, its facilities and employees are viewed by customers. Such evaluations enable management of the business operation to identify and correct problems before customers are lost. Further, performance evaluations apprise management as to how their particular business operation compares to others in the marketplace.

One example of a performance evaluation method is disclosed in U.S. Pat. No. 5,630,069 to Flores et al. ('069 reference). The '069 reference discloses a method and system which provides business consultants and analysts with a unified tool with which to conduct business process analysis, design and documentation. The invention is directed to a method of analyzing workflow to support the analysis and mapping of existing business processes and designing new business processes. A fundamental concept of workflow analysis is that any business process can be interpreted as a sequence of basic transactions called workflows. Each workflow has a customer, a performer, and conditions of satisfaction.

Although not a performance evaluation method, U.S. Pat. No. 5,675,662 to Deaton et al. ('662 reference) discloses a method directed to improving performance. The '662 reference teaches a method and system to facilitate check transactions. The method reduces the requirements for customer identification and enables a store to adopt a risk management approach to check verification based on a customer's transactional history. The method seeks to improve a store's marketing and customer relations programs.

A market research system and method for collecting retail store and shopper market research data are disclosed in Lu et al., U.S. Pat. No. 5,331,544 ('544 reference.) In the '544 reference, retail sales transactions are monitored at point-of-sale and video images of retail customers are captured for identifying customers and storing data related to sales transactions.

None of the references teach or suggest a method for objectively measuring and rating operations and employee performance of business operations. There is a need for a new and improved performance evaluation method and system for use by business operations. A need also exists for an objective performance evaluation method and system for use by management of a business operation to improve customer relations. Further, there is a need for an objective performance evaluation for use by management of business operation to compare to other stores in the marketplace.

SUMMARY OF THE INVENTION

The present invention is a new and improved, essentially objective, method and system for evaluating the performance of business operations through the use of data obtained by anonymous shoppers. The method and system provide executives and managers of retail operations with an essentially objective evaluation of the performance of business operations and their employees so that problems can be identified and corrected.

In one preferred method for evaluating quality service though the use of anonymous shoppers, essentially objective evaluation parameters for a business operation are formulated and essentially objective questions are composed based on these parameters. Anonymous shoppers are trained to monitor quality service and provide essentially objective responses. Key areas of quality service are evaluated by responses to questions. Numerical ratings are assigned to the responses. These numerical ratings are calculated by rated values according to a weighted point system. The numerical ratings are combined for each key area of business operation. The numerical ratings are calculated by entering into a computer to generate one or more managerial reports. The managerial reports can be written reports or in the form of graphs.

In another preferred method, the steps of evaluating key areas of the business operation, assigning numerical ratings to the responses to questions, combining the ratings of the key areas and then combining those ratings for a single overall rating for the entire store, are repeated after one or more time intervals. During this method, the data is entered into a computer and a computer program is executed to generate a managerial report comparing quality service of one store over at least two different time intervals. Alternatively, the evaluation is repeated for one or more business operations within a chain of business operations and the resulting data entered into a computer to generate a managerial report comparing the performance of two or more evaluated business operations within the chain. In one aspect, the computer generates managerial reports comprising written reports. Alternatively, the managerial reports can comprise one or more graphs evaluating and comparing the operations of at least two business operations within the chain.

The method of this invention can be used to evaluate various retail operations, for example: grocery store operations, coffee shops, bakeries, dry cleaning stores, automotive repair outlets, restaurants, book stores, or any store that requires quality control of service to consumers.

BRIEF DESCRIPTION OF DRAWINGS

FIG. 1 is a flowchart of one method of evaluating a business operation according to the present invention.

FIG. 2 is a flowchart of a preferred method of evaluating a business operation during different time intervals.

FIG. 3 is a flowchart of a preferred method of evaluating two or more business operation within a chain of business operations.

FIG. 4 is a flowchart of a preferred system of evaluating a business operation according to the present invention.

FIG. 5A is a sample evaluation form for use in the practice of this invention.

FIG. 5B is the sample evaluation form of FIG. 5A completed according to the method of this invention.

FIG. 10 is a sample evaluation form used to evaluate a hair salon and spa.

FIG. 11 is a sample evaluation form used to evaluate an automotive repair store.

FIG. 12 is a sample evaluation form use to evaluate a retail department store.

DETAILED DESCRIPTION OF THE INVENTION

Figure 6:
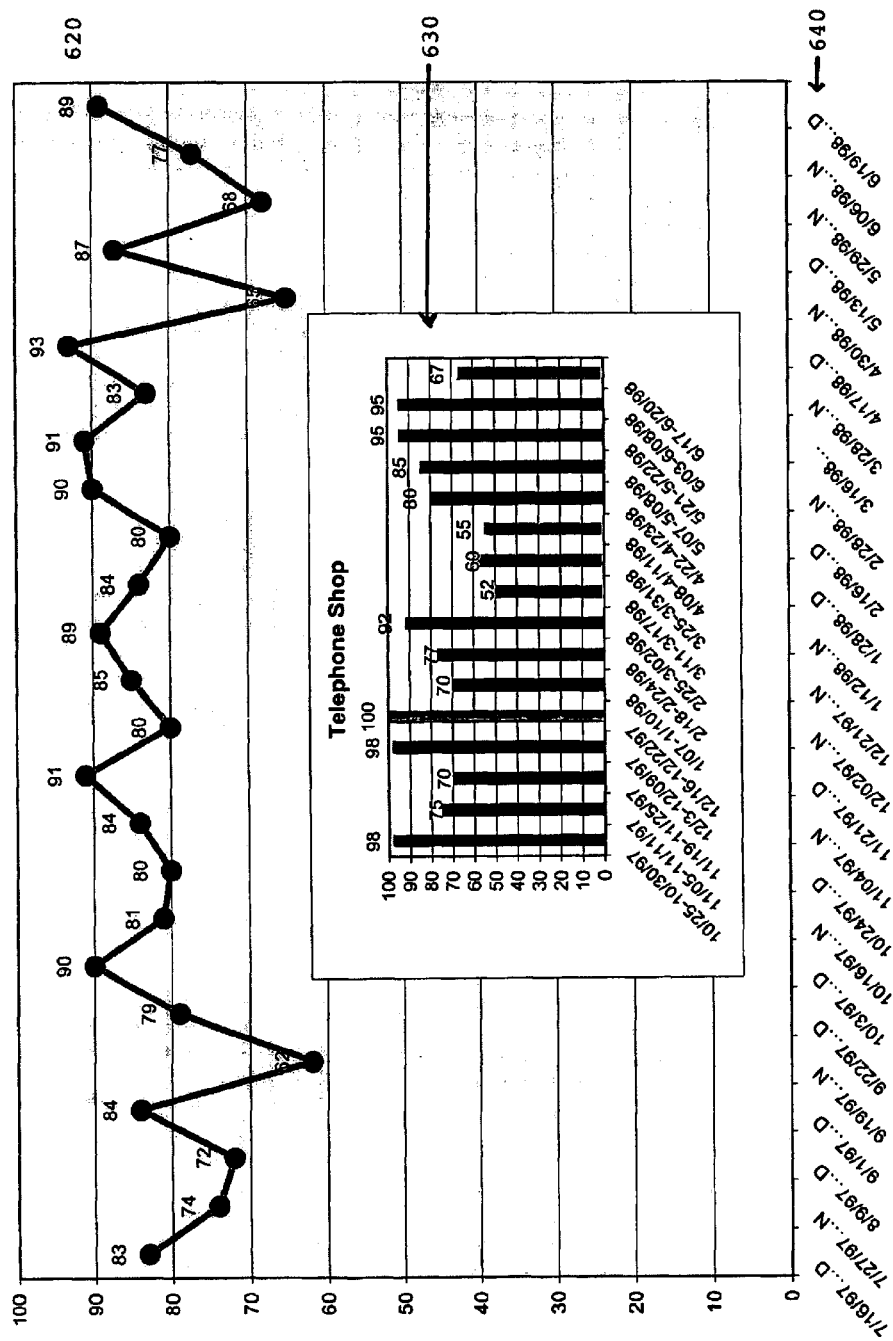
FIG. 6 is one preferred managerial report generated in the practice of this invention illustrating both on-site and telephone shops.

The present invention is a method and system for evaluating quality service though the use of anonymous shoppers. An anonymous shopper is one who, under the guise of a regular consumer of products or services, evaluates business operations. The preferred method and system provide executives and managers of business operations with an essentially objective evaluation of the performance of its business operations through the analysis of data obtained by the anonymous shoppers. Executives and managers can maintain quality control of business operations that are typically customer service operations because objective information is provided that identifies and pinpoints the causes of under-performance in a business operation. The method and system of the invention can also be used by a company to explore and compare competitors' operations.

Performance evaluations of a business operation by an anonymous shopper provide an objective picture of how a business, its facilities and employees are viewed by customers. Such evaluations enable management of the business operation to identify and correct problems, such as outdated perishables on the supermarket shelves, before customers are lost. The present method of evaluating quality service can be repeated over specific time intervals to determine if previous problems have been corrected or if additional negative issues arise. Further, performance evaluations can apprise senior management as to how one particular business operation compares to others in a chain of business operations so that a multi-business operation chain can provide the same standard of quality in all stores thereby maintaining a competitive edge in the marketplace. Problems that cause certain business operations to be less productive are identified during the practice of this invention and, therefore, may be corrected.

Referring now to the flowchart of FIG. 1, the first step 110 in the present method of evaluating a business operation comprises formulating essentially objective evaluation parameters for a specific business operation, and, based on those parameters, composing essentially objective questions 110. The anonymous shopper is taught to respond to the questions in an essentially objective manner according to guidelines in a training manual. Preferably, the various business operations are segmented and performance criteria created for each key area of business operation. For example, the areas of operation of a supermarket may include a deli department, a bakery, rest rooms or checkout. Performance parameters for each key area are established by interviews with managers and excecutives and questions are composed that elicit essentially objective answers by the anonymous shopper. Example 1 lists two performance segments of a supermarket and some of the essentially objective questions based on performance parameters for that key area of operation.

EXAMPLE 1

| PRODUCE | | |
| --- | --- | --- |
| Were fruit & vegetables fresh/appealing? | Y | N |
| Was everything clearly priced/marked? | Y | N |
| Was everything neatly arranged? | Y | N |
| Were floor and mats neat & clean? | Y | N |
| BAKERY | | |
| Was everything neat and organized? | Y | N |
| Was everything clearly priced/marked? | Y | N |
| Were sample trays available/filled? | Y | N |
| Ask to sample a cookie, or make a purchase. | | |
| Was associate handling food properly? | Y | N |
| Were associates wearing a hat/hair pulled back? | Y | N |

All questions are phrased to require a yes or a no answer to achieve objectivity. An anonymous or mystery shopper is trained to provide essentially objective responses to the questions 120. The answers can be input on an electronic or a printed form or scanned through the use of an electronic data entry device.

On site training as well as a training manual are used to teach the anonymous shopper the criteria for responding objectively "yes" or "no" the questions. Appendix A is attached hereto and is incorporated herein by reference, is a sample training manual for training an anonymous shopper to evaluate a supermarket. Following is an excerpt from Appendix A, illustrating the type of training used to teach a shopper how to answer the above-listed questions.

Produce

Were fruit & vegetables fresh/appealing?

Answer NO if you find food items which are moldy, overripe, etc.

Was everything clearly priced/marked?

Answer NO if you find items which do not have the item name and price clearly indicated.

Was everything neatly arranged?

Answer NO if products are in disarray or intermixed.

Were floor area and mats neat & clean?

A few small bits of litter are acceptable. If you see a pattern of litter, dirt or scuffs, return to the department before leaving the store to see if the problem has been corrected. If it has not, answer NO and describe what you found.

Bakery and Seafood/Meat and Deli Departments

Was everything neat and organized?

If you see items intermixed, icing smeared on glass, many crumbs, products not forward on shelves, this would be answered NO.

Was everything clearly priced/marked?

Answer NO if you find items which do not have the item name and price clearly indicated.

Were associates wearing a hat/hair pulled back?

Associates in these departments should be wearing a hat. The exception is if the associate has long hair that is pulled back and fastened with a hairnet, tie or clip.

Were associate(s) helpful and friendly?

In each department, approach an associate and ask a question or ask for assistance. Did the associate smile and/or make you feel comfortable asking a question? Did they answer your question or get an answer for you?

An essential feature of this method of evaluating quality service is objectivity. Because the human factor cannot be eliminated, observations may not be completely objective. However, the step of training anonymous shoppers 120 as to what constitutes a "yes" or a "no" answer is conducive towards objectivity. The anonymous shoppers are trained to observe a key area and respond to the questions by what they actually observe, not, for example, by the shopper's own subjective standards of cleanliness or politeness. After training, the anonymous shopper is given an assignment and a Sample Evaluation Form as illustrated in FIG. 5A. The evaluation form can be a printed hard copy or in an electronic format to facilitate data entry. Hand held electronic data entry devices are well known. Alternatively the printed paper form can be designed to be read by an electronic scanner. The sample evaluation form of FIG. 5A is for use in the evaluation of a supermarket. The anonymous shopper identifies the store and date and time of evaluation 510 and proceeds to evaluate the store 130 according to the specific method outlined in the manual. In the evaluation of a supermarket, key areas can comprise: the exterior 520, inside store 530, produce department 540, bakery 550, seafood/meat department 560 hot deli 570, Restrooms 580 and checkout 590. Certain key areas of the retail store are selected for reevaluation after a specific time period to determine if a previously identified problem has been attended. Restrooms 580 and salad bars 570, for example, may have unsightly areas that are considered typical use and are only downrated if the area is not attended and cleaned periodically.

Referring to FIG. 1, after evaluating key areas of a business operation by responding to questions 130, numerical ratings are assigned to each response 140 according to a score sheet 150, as illustrated by FIG. 5B, using a weighted point system. The numerical ratings are combined for each key area for a single rating for that area. The numerical ratings from each key area are then combined for a single overall rating of the entire retail store 150. The Evaluation Form as shown in FIG. 5A has an area 610 for inserting the numerical ratings and the final overall single numerical rating, FIG. 1, 150.

In one preferred system, points are weighted according to a direct correlation to the bottom line or profitability of the retail store. With a number is given to those items that more directly affect profitability. FIG. 5B is a sample evaluation form completed according to the method of this invention. The numbers to the left of the "yes" column are weighed points for the specific parameters. A score sheet is illustrated in FIG. 5B, uses a weighted point system to arrive at the numerical rating. Items that have a greater impact on profitability are considered more important by manager and therefore are given greater weight. For example. In FIG. 5B, at the checkout 595, questions regarding interaction with cashier such as "did the cashier greet you?" and "did the cashier immediately ask for you card" are given more weight, 3 points, than the question, "is plastic O.K.?" (one point). During one preferred method of this invention, the anonymous shopper gives points only for "yes" answers. The points can be tallied either on the evaluation form 610 or score sheet 615 and then totaled for an overall numerical rating.

The numerical ratings are then entered into the memory of a computer 160 either by scanning or manual input. Alternatively all the data from the evaluation form, such as data from the produce department 540, bakery 550 restrooms 580 etc., can be entered into a computer so that the numerical ratings are totaled and calculated by the computer. The numerical ratings can be either stored or used immediately to generate managerial reports 170 for executive managers. The executive managerial reports can take many forms. Computer software manipulates the data to create graphs, comparison charts or straight line reports. Example 2 illustrates a managerial report of retail store averages for twelve stores in a district of one large supermarket chain. The overall average is given as well as the numerical rating for key areas. Not all key areas are shown.

EXAMPLE 2

| STORE AVERAGES | |
|---|---|
| | AVG |
| District #1 | |
| 1 | 91 |
| 2 | 82 |
| 3 | 88 |
| 4 | 89 |
| 5 | 86 |
| 6 | 84 |
| 7 | 84 |
| 8 | 85 |
| 9 | 88 |
| 10 | 85 |
| 11 | 90 |
| 12 | 88 |
| STORE 1 | |
| Exterior | 66 |
| Inside the Store | 72 |
| Restrooms | 80 |
| Bakery | 88 |
| Seafood/Meat | 90 |
| Deli | 50 |
| Checkout | 83 |
| STORE 2 | |
| Exterior | 91 |
| Inside the Store | 80 |
| Restrooms | 82 |
| Bakery | 86 |
| Seafood/Meat | 100 |
| Deli | 87 |
| Checkout | 82 |
| STORE 3 | |
| Exterior | 87 |
| Inside the Store | 63 |
| Restrooms | 64 |
| Bakery | 68 |
| Seafood/Meat | 86 |
| Deli | 54 |
| Checkout | 86 |
| STORE 4 | |
| Exterior | 91 |
| Inside the Store | 83 |
| Restrooms | 92 |
| Bakery | 88 |
| Seafood/Meat | 96 |
| Deli | 85 |
| Checkout | 92 |

Figure 13:
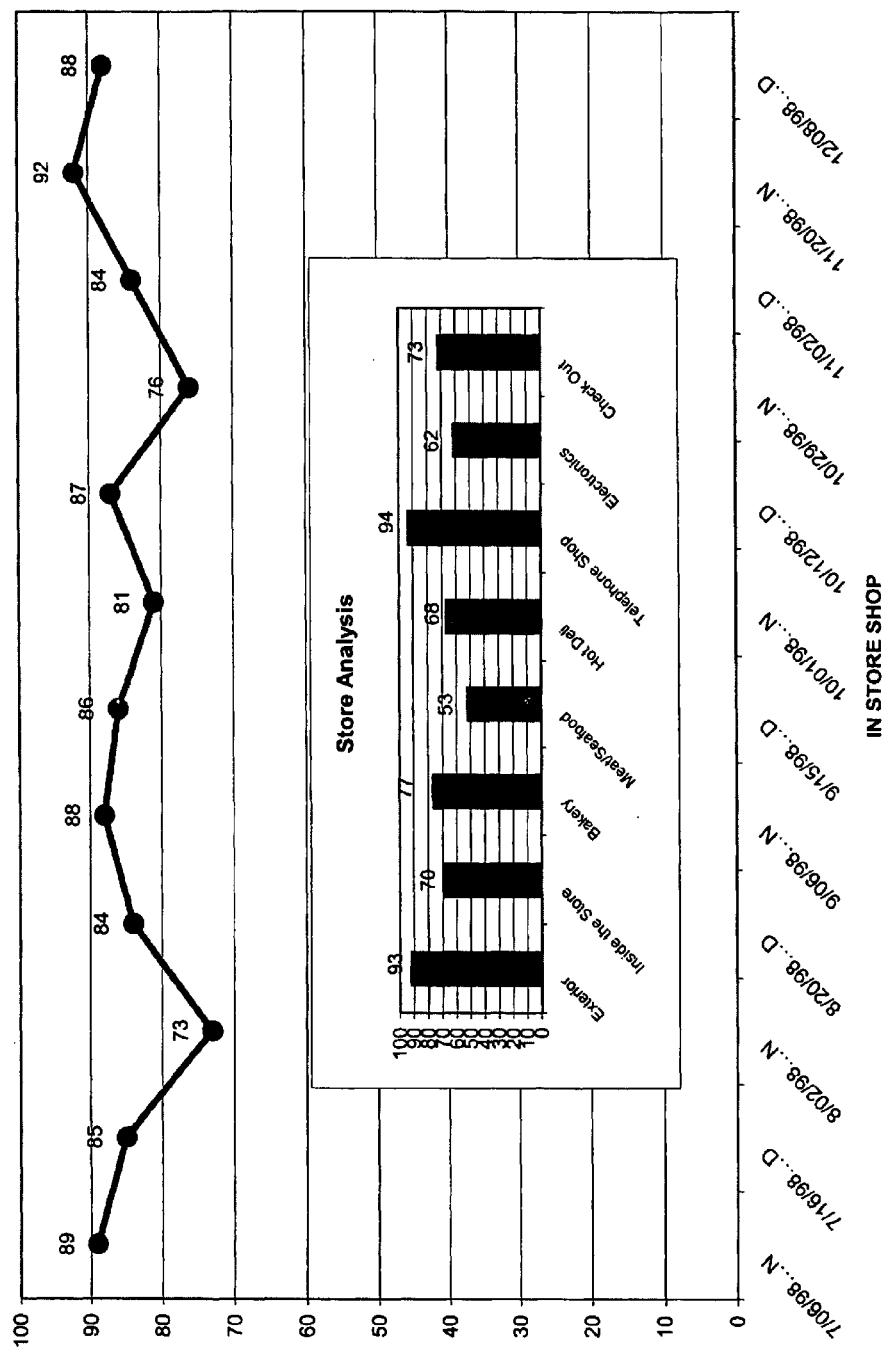
FIG. 13 is a sample evaluation illustrating a line graph of one store and an individual store analysis.
Figure 14:
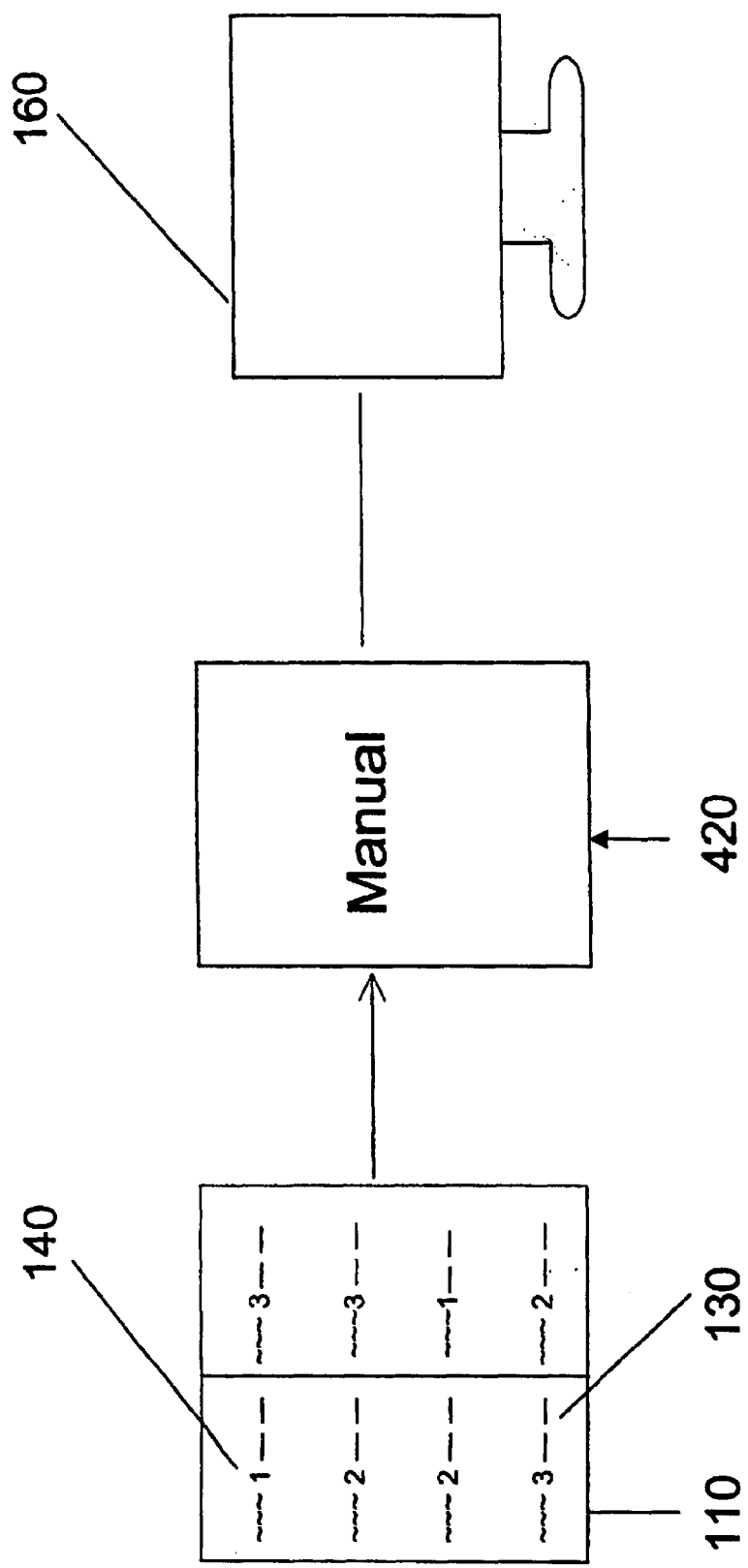
FIG. 14 is a schematic illustration one preferred system of this invention.

Using the numerical ratings for each of the supermarkets, an executive manager can determine which stores are not up to par and, more particularly, key areas of the problem stores that are not functioning according to company standards. FIG. 13 illustrates both a line graph of one store taken during the time period from Jul. 8, 1998 to Dec. 8, 1998 and an insert of a bar graph of the store taken on Oct. 29, 1998. The line graph compares the overall rating of the store over a period of time and the bar graph compares the rating of each department in one particular day. Particular data for each date can be viewed as an insert by clicking on the overall rating for that date.

With some types of business operations, parameters to be evaluated are measured by scientific data so that the responses are substantially objective. When evaluating a retail coffee shop, for example, the temperature of the coffee is measured using thermometers.

FIG. 10 illustrates the essentially objective questions required to evaluate a hair salon and spa. After training, an anonymous shopper is given a scoring sheet having weighted points. The anonymous shopper uses the services of the salon under evaluation and then completes the form and score sheet. The weighted numerical ratings are either scanned or entered into a computer by a data entry operator. The computer analyses the data to create the various reports, graphs etc. for use by the executives and managers of the hair salon.

FIG. 11 is an example of an evaluation form used to evaluate quality of service of an automobile repair shop and FIG. 12 examplifies the type of form used in a department store selling a variety of items.

The method and system of the present invention is limited to the examples presented herein but can be used in any business operation providing retail or consumer services to measure the quality of service in an essentially objective manner.

FIG. 2 is a flow chart of another preferred method of evaluating quality service. In this method, the steps of evaluating key areas of store operations 230, assigning numerical ratings to the responses 240, combining the resulting ratings 250, and entering the single number rating into a computer 260 are repeated over two or more specific time periods 270 to generate several sets of data for the same store. A computer software program can be used to generate managerial reports 280 based on the numerical data and ratings.

FIG. 6 illustrates another type of managerial report comparing the evaluations of one business operation over one year period based on both on-site (line graph 620) and telephone shops (bar graph 630). In this example report, the business operation was evaluated twice each month (with the exception of August), once during the day shift and once during the evening shift, for a period of one year 640. Evaluating business operations during different shifts enables management to pinpoint employees who are responsible for the quality of operations during their shift. Evaluating a business operation over specific time periods, such as a year, gives valuable information to executive managers regarding the quality of operations. This information can be compared to the productivity of the business and corrective measures taken to make a business operation more productive, if necessary. A graph is used in this managerial report to illustrate peaks and valleys of store operations 620. In this way, the manager can visually see the high and low points of operations.

In another preferred method of evaluating a business operation, the questions can be asked by telephone rather than on-site visits. Example 3 illustrates the type of objective questions that can be asked during a telephone interview of a retail store business.

EXAMPLE 3

Store Number:____  Evaluator Number:____
Store Phone Number:_____
Department:____  Associate's name:____
Date:____  Day:____
Time:____
How many rings before you received an answer? ____
How long before the phone was picked up by a department associate?
____min  ____sec.
Was the associate pleasant-sounding and friendly?
Yes___  No___
Did he/she answer the question knowledgeably/correct?
Yes___  No___
Did he/she offer additional information?
Yes___  No___
Was he/she enthusiastic or encouraging you to come into the store?
Yes___  No___
Based on this conversation ONLY did you feel like either purchasing that item or
visiting that store?
Yes___  No___

The telephone interview evaluations can be rated according to the weighted point system used for in-store evaluations and single number ratings calculated for comparison to the store's previous evaluations or to the evaluation of other stores within a chain. In one method of practicing this invention, the anonymous shopper can do at least three telephone interviews of the same store and the same departments within a short period of time, a week, for example, and average the ratings for one overall score. FIG. 6, depicts the evaluation ratings over a twelve-month period of time for both in-store evaluations 620 and telephone evaluations 630. The telephone evaluation graph is a bar graph 630 and the "bars are shaded, or alternatively, can be printed in color, to quickly identify stores that are performing within certain ranges. In this Example, the poorer performing stores have lower numerical ratings and are shown in the lighter shading.

FIG. 3 is a flow chart depicting a method for evaluating business operations for two or more business operations within a chain. During this method, the steps of evaluating key areas of operations 330, assigning numerical values to the responses 340, combining the ratings for key areas and then for a single overall rating 350, and entering the resulting single number rating into a computer 360 are repeated for two or more business operations within the chain 370. A software program is used to generate one or more managerial reports comparing the performance of the evaluated stores within the chain 380.

Figure 7:
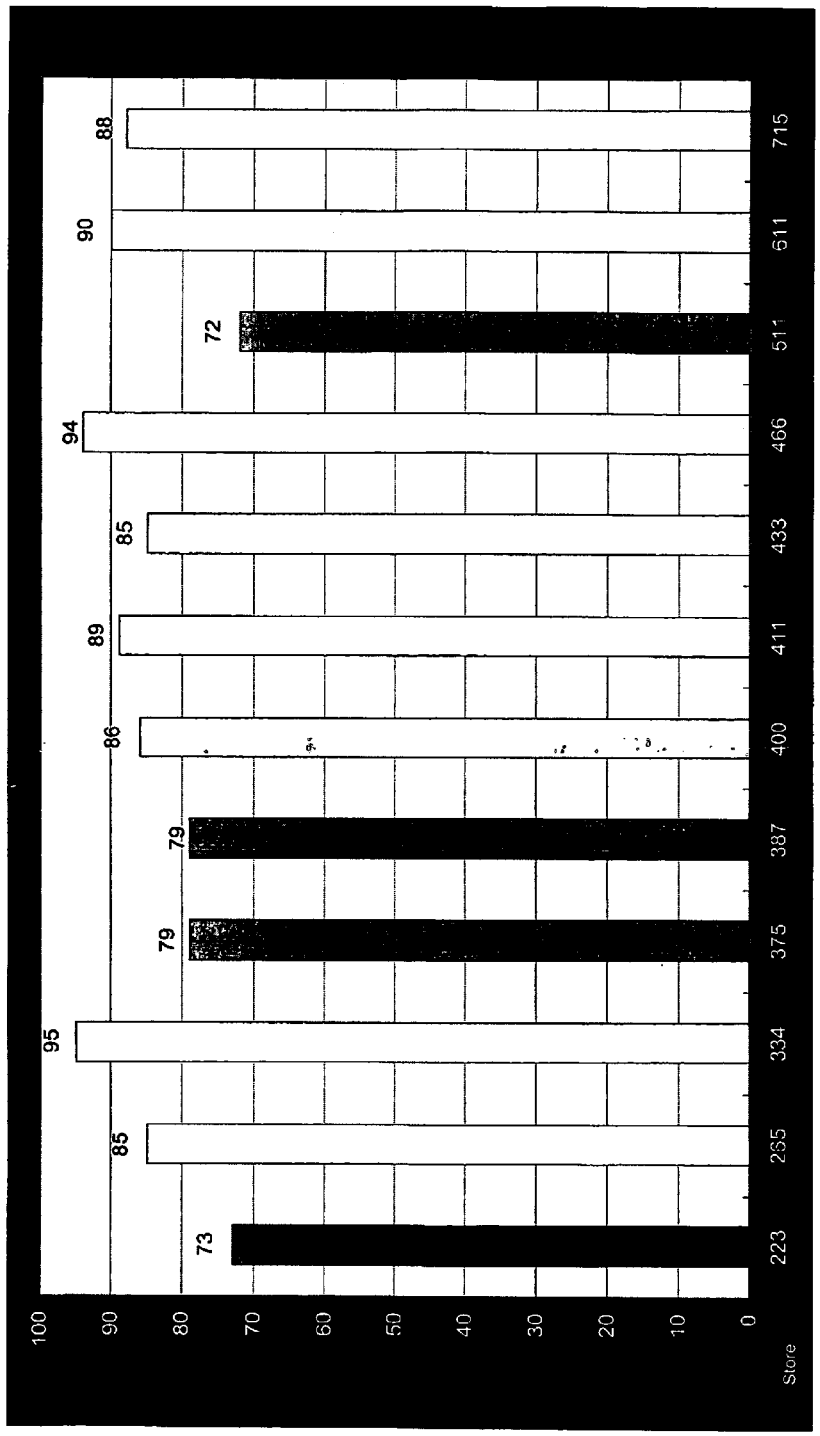
FIG. 7 is an alternative managerial report generated according to the practice of this invention comparing several stores within a chain.
Figure 8:
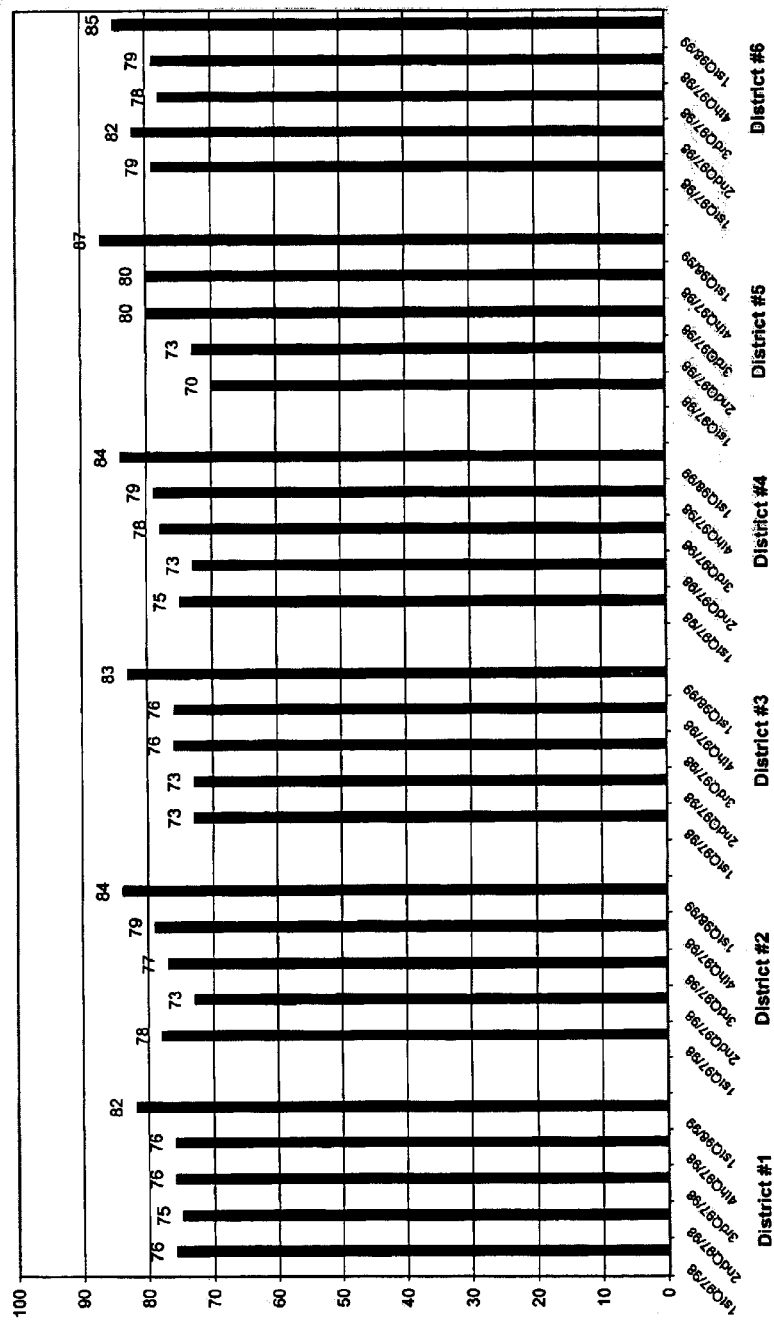
FIG. 8 is still another alternative managerial report generated in the practice of this invention comparing quarterly average of several districts.
Figure 9:
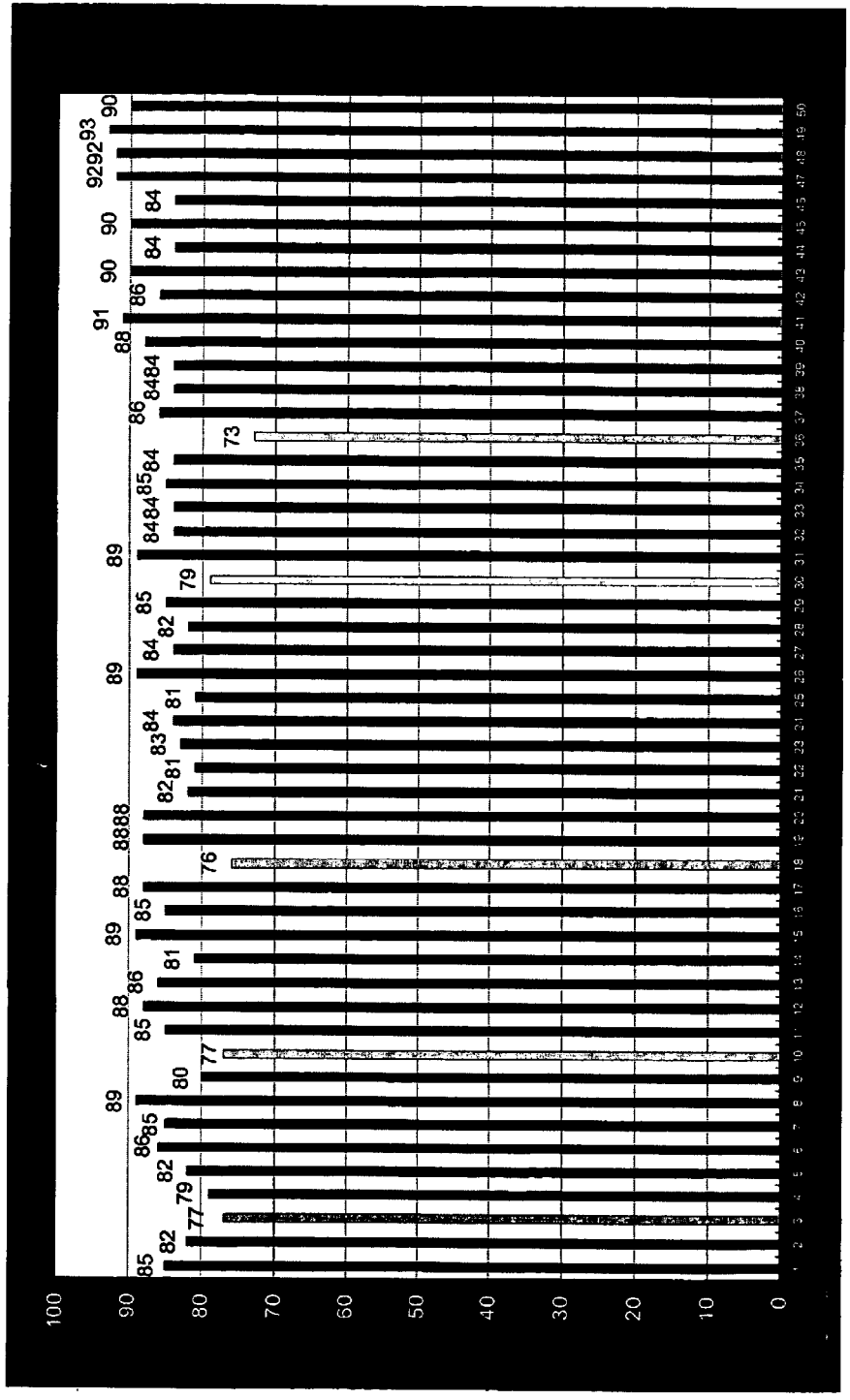
FIG. 9 is a further alternative managerial report generated according to the practice of this invention.

Using bar graphs for the managerial reports, FIG. 7 depicts a sample evaluation rating of retail stores in one district of the chain for one time period. Colors or shading can be used for the different ratings. The bar graph of FIG. 7 shows stores averaging a rating of 90 or above in black and stores averaging a rating in the 80's in a lighter shade. FIG. 8 and FIG. 9 depict the quarterly and yearly performance of all the stores within a chain.

Using several different types of managerial reports, FIGS. 5–7, and the type of report illustrated in Example 2 for example, allows an executive manager to quickly determine not only which stores have problems but also the key areas and personnel that are not performing at company's standards.

FIG. 4 is a flow chart depicting the system of the present invention. The system for evaluating quality service comprises a plurality of essentially objective questions based on essentially objective evaluation parameters formulated for the business operation 410. The questions can be grouped according to key areas of the business operation to be evaluated. The system further comprises a manual for training anonymous shoppers to monitor quality service and provide essentially objective responses to the questions 420. Appendix A is a typical training manual 420 for evaluating a supermarket according to the system of this invention. One aspect of the present system further comprises means for use by anonymous shoppers to evaluate key areas of quality service 430. One preferred means is a sample evaluation form, as illustrated in FIG. 5A, comprising questions that are composed according to essentially objective evaluation parameters. Preferably, these questions can be answered by a "yes" or "no" answer.

Another aspect of this system is a means for assigning numerical values to the essentially objective responses. A preferred means is a score key, as illustrated by FIG. 5B, that assigns weighted point values to each response. Each item on the evaluation form is rated according such a score key that is provide to the anonymous shopper. The anonymous shopper uses the score key to determine the numerical rating for each response. Preferably, the evaluation form comprises a space for the numerical ratings. A means for combining the numerical ratings for a single rating for each key area or department, and then combining the key area numerical ratings to arrive at a single overall rating for the business operation is a further aspect of the preferred system. Preferably, the evaluation form has a scoring area 610 for the numerical ratings. In the preferred system, a computer is used for compiling the ratings and executing a computer program to generate a managerial report based on the ratings 450. Managerial reports can be written reports, the type of report illustrated in Example 2 for example, or graphs such as those depicted in FIGS. 6–13. Such reports allow an executive manager to quickly identify problem areas of business operations that have either an actual or a potential loss of customers and revenues and the key areas and personnel of the identified stores that are not performing at company's standards.

In another preferred embodiment of the present invention, the method and system for evaluating business operations can be used by vendors who supply products, such as bread or coffee, to a business operation and are responsible for setting up and maintenance of the displays for these products. Quality control of the vendor's display can be evaluated by the present method as described above.

The foregoing description is illustrative and explanatory of preferred embodiments of the invention, and variations in the method, systems and other details will become apparent to those skilled in the art. It is intended that all such variations and modifications which fall within the scope or spirit of the appended claims be embraced thereby.

What is claimed is:

1. A method for evaluating quality service comprising steps:
  a. formulating essentially objective evaluation parameters for a business operation and composing essentially objective questions based on the parameters;
  b. training anonymous shoppers to monitor quality service and provide essentially objective responses to questions prepared in step (a);
  c. evaluating key areas of quality service by responses to questions composed according to parameters formulated in step (a) using anonymous shoppers trained to respond to questions according to step (b);
  d. assigning a numerical rating using a weighted point system to responses elicited in step (c);
  e. combining the numerical ratings from step (d) for each key area of business operation and further combining the resulting numerical ratings for a single overall rating of the business operation;
  f. entering the numerical ratings from step (e) into a computer; and
  g. using computer software to generate a managerial report from the data entered in step (f);
  wherein the steps (a) to (f) are repeated after one or more time intervals, the method further comprising step (k): executing a computer program to generate a managerial report comparing quality service of one business operation over at least two different time intervals.

2. The method of claim 1 wherein the questions composed according to step (a) require a yes or no response.

3. The method of claim 1 wherein the questions are grouped according to key operation areas of the business operation.

4. The method of claim 1 further comprising the steps of: (i) selecting key areas of the business operation evaluated according to step (c) for reevaluation after a specific time period and (j) reevaluating the selected key areas.

5. The method of claim 1 wherein the numerical ratings from step (e) are entered into a computer to generate a graph comparing the operating performance of one business operation over at least two different time intervals.

6. The method of claim 1 wherein the steps (c) to (f) are repeated for one or more business operations within a chain of business operations and the resulting data entered into a computer to generate a managerial report comparing the performance of the evaluated business operations within the chain.

7. The method of claim 6 wherein the computer generated managerial report comprises a graph evaluating and comparing the operations of at least two business operations within the chain.

8. The method of claim 1 wherein the evaluation parameters are formulated for grocery store operations.

9. A method for evaluating quality service comprising:
  a. formulating essentially objective evaluation parameters for a business operation comprising two or more retail stores and composing essentially objective questions based on the parameters;
  b. training anonymous shoppers to monitor quality service and provide essentially objective responses to questions prepared in step (a);
  c. evaluating key areas of quality service by responses to questions composed according to parameters formulated in step (a) using anonymous shoppers trained to respond to questions according to step (b);
  d. assigning a numerical rating using a weighted point system to responses elicited in step (c);
  e. combining the numerical ratings from step (d) for each key area of business operation and further combining the resulting numerical ratings for a single overall rating of the business operation;
  f. entering the numerical ratings from step (e) into a computer;
  g. repeating steps (c) to (f) after one or more specific time intervals to generate at least two sets of data;
  h. executing a computer program to compare the sets of data from step (g) and generate a managerial report comparing quality service of one retail store over at least two different time intervals.

10. The method of claim 9 wherein the numerical ratings from step (e) of claim 1 are entered into a computer to generate a graph comparing the operating performance of one business operation over at least two different time intervals.

11. A method for evaluating quality service comprising:
a. formulating essentially objective evaluation parameters for a specific business operation and composing essentially objective questions based on parameters;
b. training anonymous shoppers to monitor quality service and provide essentially objective responses to questions prepared in step (a);
c. evaluating key areas of quality service by responses to questions composed according to parameters formulated in step (a) using anonymous shoppers trained to respond to questions according to step (b);
d. assigning a numerical rating using a weighted point system to responses elicited in step (c);
e. combining the numerical ratings from step (d) for each key area of business operation and further combining the resulting numerical ratings for a single overall rating of the business operation;
f. entering the numerical ratings from step (e) into a computer;
g. repeating steps (c) to (f) for one or more business operations within a chain of business operations;
h. executing a computer program to generate a managerial report comparing the performance of the evaluated business operations within the chain.

12. The method of claim 11 wherein the managerial report comprises a graph evaluating and comparing the operations of at least two business operations within the chain.

* * * * *

UNITED STATES PATENT AND TRADEMARK OFFICE
CERTIFICATE OF CORRECTION

PATENT NO. : 6,952,679 B1
DATED : October 4, 2005
INVENTOR(S) : Pulford, Sondra

It is certified that error appears in the above-identified patent and that said Letters Patent is hereby corrected as shown below:

<u>Title page,</u>
Item [73], Assignee, should read -- Texas Shoppers Network, Inc. --.

Signed and Sealed this

Fourth Day of April, 2006

JON W. DUDAS
*Director of the United States Patent and Trademark Office*